United States Patent [19]

Price, Jr. et al.

[11] Patent Number: 5,072,838
[45] Date of Patent: Dec. 17, 1991

[54] TAPE CARTRIDGE STORAGE SYSTEM

[75] Inventors: Macy J. Price, Jr., Louisville; Mack E. Johnson, Arvada; Daniel C. Starkey, englewood, all of Colo.

[73] Assignee: Engineered Data Products, Inc., Broomfield, Colo.

[21] Appl. No.: 551,131

[22] Filed: Jul. 6, 1990

Related U.S. Application Data

[63] Continuation-in-part of Ser. No. 343,952, Apr. 26, 1989, abandoned.

[51] Int. Cl.⁵ ............................................. A47F 5/00
[52] U.S. Cl. ................................... 211/162; 211/41; 211/122; 316/245; 316/198
[58] Field of Search ............... 211/122, 162, 188, 151, 211/1.5, 10, 41; 206/387; 312/245, 246, 250, 198; 49/404, 425, 431; 248/188.4

[56] References Cited

U.S. PATENT DOCUMENTS

| | | | |
|---|---|---|---|
| 447,658 | 3/1891 | Brockmann | 211/162 |
| 1,529,523 | 3/1925 | Whitehouse | 49/431 |
| 1,730,001 | 10/1929 | Fisher | 49/431 |
| 2,098,828 | 11/1937 | Ludwick | 211/162 X |
| 3,097,401 | 7/1963 | Riegelman | 49/425 |
| 3,167,112 | 1/1965 | Tucker | 49/425 |
| 3,175,255 | 3/1965 | Saunders | 49/425 |
| 3,237,238 | 3/1966 | Anderson | 49/425 |
| 3,537,769 | 3/1970 | DiCarlo | 312/250 |
| 3,670,357 | 6/1972 | Steigerwald | 49/425 X |
| 3,745,706 | 7/1973 | Stermac | 49/425 |
| 3,855,732 | 12/1974 | Sheaf | 49/425 |
| 3,996,643 | 12/1976 | Steigerwald | 49/425 X |
| 4,064,592 | 12/1977 | Riegelman et al. | 49/425 X |
| 4,262,451 | 4/1981 | Dallaire | 49/425 |
| 4,427,244 | 1/1984 | Castagna | 312/198 X |
| 4,600,107 | 7/1986 | Price et al. | 211/41 |
| 4,633,615 | 1/1987 | Moose | 49/425 |
| 4,850,145 | 7/1989 | McAfee | 49/404 X |

FOREIGN PATENT DOCUMENTS

| | | | |
|---|---|---|---|
| 1424126 | 11/1965 | France | 49/425 |
| 2601408 | 1/1988 | France | 49/425 |
| 0745694 | 2/1956 | United Kingdom | 49/404 |

OTHER PUBLICATIONS

Publication by Cope Industries.
DEMCO, "Quality Supplies and Equipment," Office Supply Catalog, 1988.

Primary Examiner—Robert W. Gibson, Jr.
Attorney, Agent, or Firm—Joseph J. Kelly; Bruce G. Klaas

[57] ABSTRACT

Apparatus for use in the storage and retrieval of tape cartridges is provided and comprises a fixed storage rack having horizontal shelves for holding tape cartridge storage holders, and a plurality of movable storage racks are mounted for rolling movement in front of the fixed storage rack. Male and female guides on the fixed storage rack and the movable storage rack guide the movement of the movable storage rack. A roller assembly is mounted on each of the movable storage racks and has one wheel mounted on a fixed axle and a second wheel mounted on an adjustable axle so that each movable storage rack may be adjusted to align it with the fixed storage rack.

14 Claims, 3 Drawing Sheets

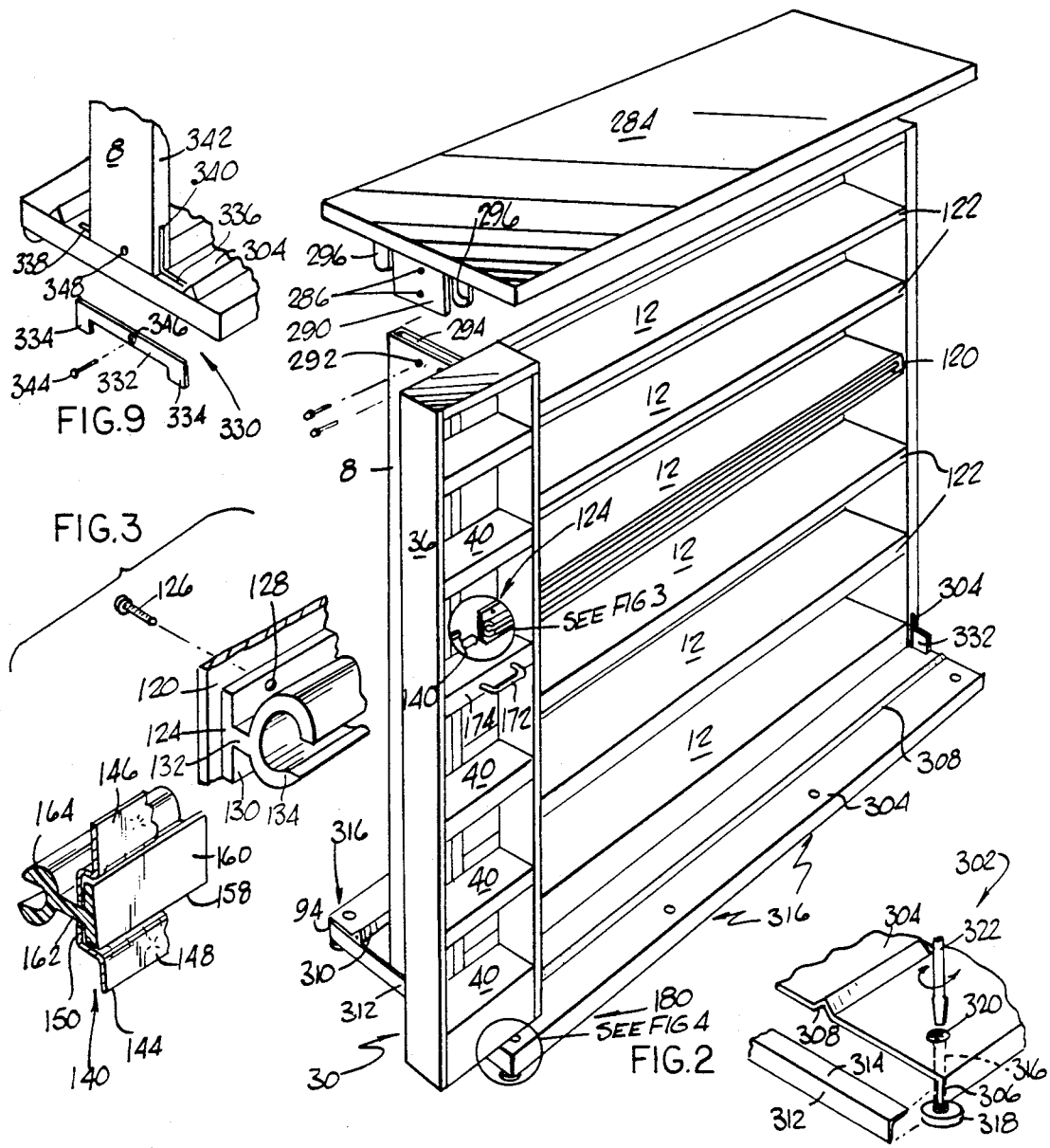

TAPE CARTRIDGE STORAGE SYSTEM

This application is a continuation-in-part of U.S. patent application Ser. No. 343,952 filed Apr. 26, 1989, now abandoned for Tape Cartridge Storage System.

FIELD OF THE INVENTION

This invention relates to the storage of tape cartridges and in particular to a tape cartridge storage system wherein the maximum number of tape cartridges may be stored in a minimum space.

BACKGROUND OF THE INVENTION

The use of computers in today's business operations has generated a pressing problem relating to the storage and retrieval of tape cartridges. With the costs of office space increasing regularly and the number of tape cartridges requiring space for storage and retrieval also increasing, computer departments are searching constantly for more effective systems for the storage and retrieval of tape cartridges. There are several types of storage systems on the market for use in the storage and retrieval of tape cartridges, but all storage systems are constantly fighting the battle of being able to store the maximum number of tape cartridges in the minimum space. Also, the storage system must be rugged so as to withstand the constant use. In storage systems having movable tape cartridge storage racks located in front of a fixed tape cartridge storage rack, some difficulties have been encountered due to the warping or deflection of the base and track over which the movable tape cartridge storage racks are moved. This problem is also caused by the uneven loading of the movable tape cartridge storage racks due to the absence of most of the tape cartridges from one or two of the movable tape cartridge storage racks and presence of all of the tape cartridges in the other movable tape cartridge storage racks.

BRIEF DESCRIPTION OF THE INVENTION

This invention provides a system in which tape cartridges may be readily stored and retrieved and wherein a maximum number of tape cartridges may be stored in a minimum space. The invention provides a fixed storage rack means having at least a first open wall portion facing an aisle and a first plurality of movable storage rack means mounted for movement in linear directions parallel to the first open wall portion to increase substantially the number of tape cartridges normally available to a person standing in the aisle and facing the fixed and movable storage rack means.

In a preferred embodiment of the invention, the tape cartridge storage system comprises a fixed storage rack means comprising a frame having a base, two spaced apart sidewalls and a top wall portion. A plurality of horizontally-extending, vertically-spaced-apart shelf means are secured at each end thereof to an adjacent sidewall, preferably by welding. A plurality of box-type tape cartridge storage holder units are provided and comprises an open housing that is dimensioned to fit between adjacent shelf means and have a length related to each of the shelf means so that a plurality of the tape cartridge storage holder units supported in side-by-side relationship on one of the shelf means will completely fill the length thereof. Each tape cartridge storage holder unit has an upper flange and a lower flange and is inserted between adjacent shelf means until the upper and lower flanges contact facing surfaces of the adjacent shelf means. The shelf means of the fixed storage rack means define a plurality of horizontally-extending, vertically-spaced-apart, equally-sized storage openings for receiving and supporting the tape cartridge storage holder units in back to back and side-by-side relationships in each of the storage openings in a plurality of horizontally-extending, vertically-spaced-apart rows of tape cartridge storage holder units with the open sides of the tape cartridge storage holder units facing outwardly away from the storage rack means to permit insertion or removal of the tape cartridges into or from the tape cartridge storage holder units and also to permit selective removal or placement of each of the tape cartridge storage holder units on one of said storage openings. A plurality of movable storage rack means are provided, each having a plurality of horizontally-extending, vertically-spaced-apart, equally-sized shelf means defining a plurality of horizontally extending vertically spaced apart rows of equal size storage openings for receiving and supporting only one of the storage holder units on the shelf means of each of the storage openings with the open sides of the tape cartridge storage holder units facing outwardly to permit insertion or removal of the tape cartridges into or from the tape cartridge storage holder units and also to permit selective removal or placement of each of the tape cartridge storage units on one of the shelf means of the storage openings. Mounting means are provided for mounting each of the plurality of movable storage rack means for movement in linear directions parallel to the shelf means and the open sides of the tape cartridge storage holder units on the storage openings in the fixed storage rack means. The plurality of movable storage rack means are in a number less than the number of the tape cartridge storage holder units that can be placed on one of the shelf means in the side-by-side relationship so that the plurality of movable storage rack means can be moved to provide for access to the tape cartridge storage holder units on the shelf means of the fixed storage rack means.

In another preferred embodiment of the invention, the movable storage rack means are provided with guide and wheel assemblies so that they are adjustable. The guide assembly comprises a female guide, formed as an aluminum extrusion, mounted on the front surface of one of the shelves of the fixed storage rack means and a male guide, an injection molded plastic material, mounted on the rear surface of one of the shelves on each of the movable storage rack means. The male guide is mounted so that it has limited movement in all directions. The roller assembly has two wheels, one of which rotates around a fixed axle and the other of which rotates around an adjustable axle. The combination of the movable male guide and the adjustable axle provides for the adjustment of the movable storage rack means whenever necessary, such as the unevenness of the surface over which it is moved.

BRIEF DESCRIPTION OF THE DRAWING

Illustrative and presently preferred embodiments of the invention are shown in the accompanying drawings in which:

FIG. 2 is a perspective view of another presently preferred embodiment of the invention:

FIG. 3 is an enlarged view of a portion of FIG. 2;

FIG. 4 is an elevational view of one of the slide attachments for the movable storage rack means;

FIG. 5 is a cross-sectional view taken on the line 5—5 of FIG. 4;

FIG. 8 is an enlarged view of another portion of FIG. 2; and

FIG. 9 is a partial perspective of the bottom portion of the fixed storage rack.

DETAILED DESCRIPTION OF THE INVENTION

Figure 1:
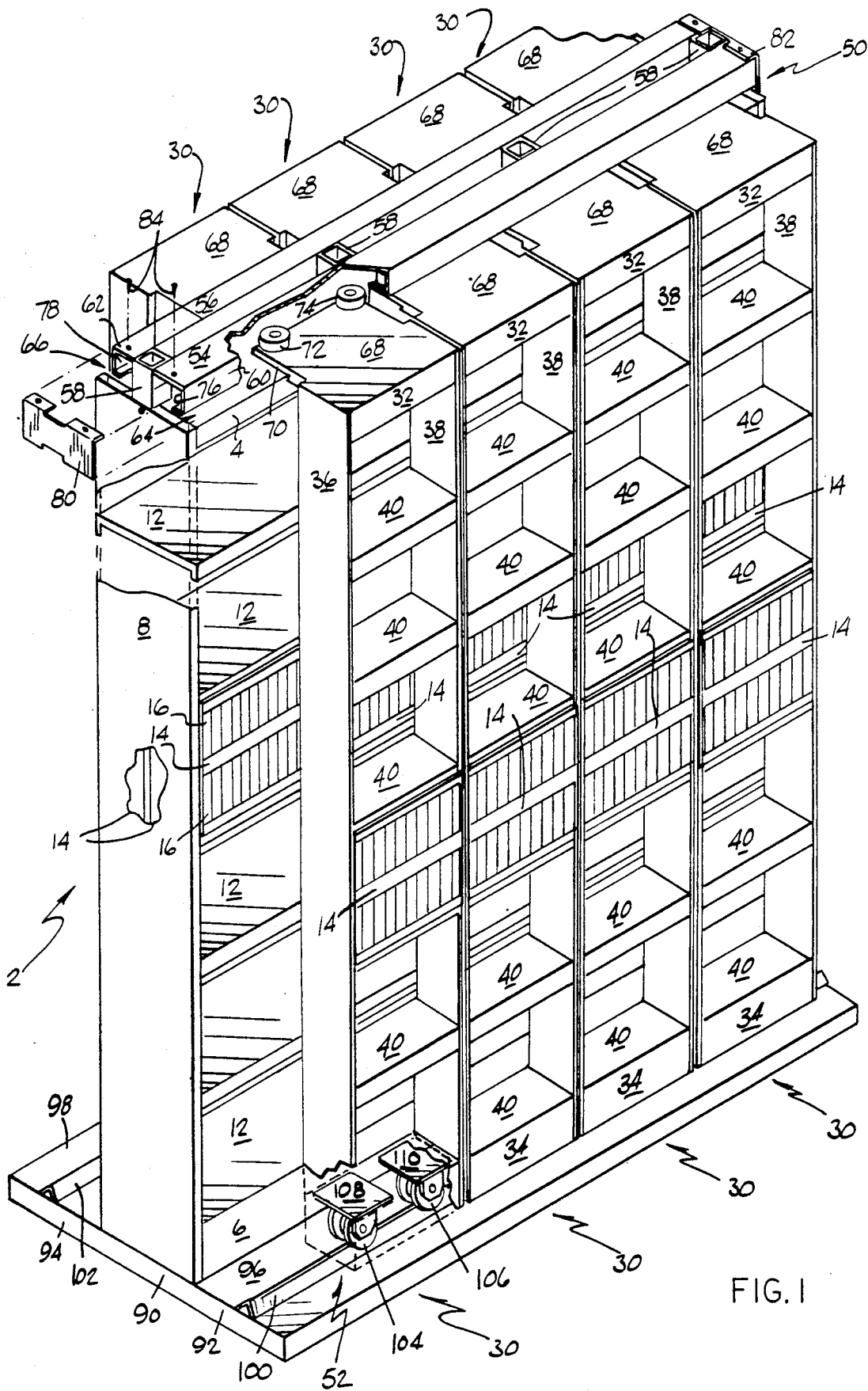
FIG. 1 is a perspective view of one presently preferred embodiment of the invention.

In the drawings, there is illustrated a preferred embodiment of the tape cartridge storage system of this invention. A fixed storage rack means 2, similar to that described in U.S. Pat. No. 4,600,107, which patent is incorporated herein by reference, is adapted to be positioned on the floor of a building. The fixed storage rack means 2 is illustrated as being a double sided rack but it is within the scope of this invention that it be a single sided rack. The fixed storage rack means 2 comprises a frame having a top portion 4, a bottom portion 6 and a pair of spaced-apart opposite sidewalls 8 and 10 with adjacent portions thereof secured together by suitable means preferably by welding. A plurality of horizontally-extending, vertically-spaced-apart shelf means 12 are secured at each end thereof to the adjacent portion of either of the sidewalls 8 and 10 by suitable means, preferably by welding. The spaced-apart shelf means 12 define a plurality of horizontally-extending, vertically-spaced-apart, equally-sized storage openings for receiving and supporting tape cartridge storage holder units 14 in back to back and side by side relationship as described more fully below. The tape cartridge storage holder units 14 are equally sized and preferably are of the type illustrated in FIGS. 3-6 of U.S. Pat. No. 4,688,860, which patent is incorporated herein by reference. Each tape cartridge storage holder unit 14 is a box-type tape cartridge storage holder unit made of one piece molded plastic material and has four sidewall portions connected at one end to a transverse connecting wall portion to provide rectangular storage space therein having an access opening. Each tape cartridge storage holder unit 14 has a central divider so that two rows of tape cartridges 16 may be placed therein. The open sides of the tape cartridge storage holder units 14 face outwardly to permit insertion or removal of tape cartridges into or from the tape cartridge storage holder units 14 and also to permit selective removal or placement of each of the tape cartridge storage holder units 14 on one of the shelf means 12. Other tape cartridge storage holder units suitable for use in this invention are those described in U.S. Pat. Nos. 4,815,795 and 4,844,564 which patents are incorporated herein by reference thereto.

A plurality of movable storage rack means 30 are provided and each of which comprises a frame having a top portion 32, a bottom portion 34 and a pair of spaced apart opposite sidewalls 36 and 38. Each movable storage rack means 30 has a plurality of horizontally extending vertically equally spaced apart shelf means 40 which are secured at each end thereof to the adjacent portions of either of the sidewalls 36 and 38 by suitable means preferably by welding. The spaced apart shelf means 40 define a plurality of horizontally extending vertically spaced apart equal size openings for receiving and supporting one tape cartridge storage holder unit 14. The open sides of the tape cartridge storage holder units 14 face outwardly to permit insertion or removal of tape cartridges 16 into or from the tape cartridge storage holder unit 14 and also to permit selective removal or placement of one of the tape cartridge storage holder units 14 on one of the shelf means 40.

Mounting means 50 and 52 are provided for mounting each of the movable storage rack means 30 in linear directions parallel to the top and bottom portions 4 and 6 of the fixed storage rack means 2 and the open sides of the tape cartridge storage holder units 14 on the shelf means 12.

The mounting means 50 comprise a pair of open channel members 54 and 56 fixedly mounted on a plurality of support members 58 which are secured to the top portion 4 by suitable means preferably by welding. The front wall portions 60 and 62 of the channel members 54 and 56 are spaced from the top portion 4 to provide continuous linearly extending openings 64 and 66, each having a length substantially the same as the length of the shelf means 12. Each of the movable storage rack means 30 has a member 68 having a portion 70 extending outwardly from the top portion 32 thereof which extends through the opening 64 or 66. Two rotatable wheels 72 and 74 which are located so as to contact the generally planar inner surfaces 76 or 78 of the front wall portions 60 and 62 are rotatably mounted on the portion 70. End covers 80 and 82 are removably secured to the channel members 54 and 56 by suitable means, such as threaded bolts 84.

The mounting means 52 comprise a base 90 having portions 92 and 94 extending outwardly from each side of the bottom portion 6 and having upper surfaces 96 and 98. Longitudinally extending tracks 100 and 102 are fixedly mounted on the upper surfaces 96 and 98 and, as illustrated in the drawing, have a transverse cross-sectional configuration that is the shape of an inverted V. Each movable storage rack means 30 is provided with a pair of spaced-apart wheels 104 and 106 which are rotatably mounted on support plates 108 and 110 which are secured to the bottom portion 34 by suitable means, preferably by welding. Each of the wheels 104 and 106 have outer peripheral surfaces shaped to mate with the inverted V-shaped track 100 or 102 to provide for guided rolling movement of each of the movable storage rack means 30 over the upper surfaces 96 or 98.

As illustrated in FIG. 1, the fixed storage rack 2 is designed to have six shelf means 12 on each of which tape cartridge storage units may be placed thereon in back to tack relationship and five tape cartridge storage holder units 14 may be placed thereon in side-by-side relationship. Therefore, sixty tape cartridge storage holder units 14 may be supported by the plurality of shelf means 12. Each movable storage rack means 30 has six shelf means 40 on which one tape cartridge storage holder unit 14 may be placed so that each movable storage rack means 30 can support six tape cartridge storage holder units 14. Since there are eight movable storage rack means 30, they can support a total of forty-eight tape cartridge storage holder units 14. Therefore, the tape cartridge storage system illustrated in the drawing can support one hundred and eight tape cartridge storage holder units 14. Since each tape cartridge storage holder unit 14 can hold twenty tape cartridges 16, the tape cartridge storage system illustrated in the drawing can support twenty-one hundred and sixty tape cartridges 16. As described above, each shelf means 12 can accommodate five tape cartridge storage holder units 14 in side by side relationship. This means that there can only be four movable storage rack means 30 so that they can be moved so that access can be made to insert or remove tape cartridges into or from the tape cartridge storage holder units 14 on the shelf means 12. Also, this permits tape cartridge storage holder units 14 to be placed on or removed from the shelf means 12. The maximum number of movable storage rack means 30 will always be one less than the number of tape cartridge storage holder units 14 than can be placed on one shelf means 12 in the side-by-side relationship. In the tape cartridge storage system, the fixed and movable storage rack means are placed on the floor of a building so that aisles are formed in which a person can stand to insert or remove tape cartridges or tape cartridge storage holder units. Also, the drawing illustrates only one shelf means 12 having tape cartridge storage holder units thereon in back to back and side-by-side relationships and one corresponding shelf means 40 having a tape cartridge storage holder unit 14, but in actual operations all of the shelf means 12 and 40 can be filled with tape cartridge storage holder units.

The movable storage rack means 30 are assembled onto the fixed storage rack means 2 by removing at least one of the end covers 80 or 82. The wheels 104 and 106 are positioned over one of the tracks 100 or 102 and in contact with the surfaces 96 or 98 and the wheels 72 and 74 are inserted within one of the channel members 60 or 62. The wheels 104 and 106 mating with the tracks 100 or 102 provide for guided rolling movement of each movable storage rack means 30 over the upper surfaces 96 or 98. The wheels 72 and 74 in contact with the inner surfaces 76 and 78 assist in guiding the movement of each movable storage rack means 30 and also prevent the movement of each movable storage rack means 30 in a direction away from the fixed storage rack means 2. The fixed storage rack means 2 and the movable storage rack means 30 are formed from sheet steel with adjacent parts welded together to form a rugged storage system capable to withstand constant use.

In the preferred embodiment of the invention, as illustrated in the drawing, the movable storage rack means 30 are designed to accommodate only one tape cartridge storage holder unit 14. However, it is within the scope of this invention for the movable storage rack means to have a length to support two or more tape cartridge storage holder units 14 in a side-by-side relationship. In such a relationship, it is necessary for the fixed storage rack means to have a length at least twice as great as the length of the movable storage rack means 30 so that the tape cartridge storage holder units 14 on the fixed storage rack means 2 can be made available for the insertion or removal of tape cartridges. Also, in another embodiment, coupling means, such as resilient U-shaped clamps, can be used to couple together adjacent movable storage rack means 2 for simultaneous movement. In a further embodiment of the invention, two or more fixed storage rack means may be placed in a side-by-side relationship and movable storage racks may be provided for linear movement in parallel directions over the fixed storage rack means in the side-by-side relationship.

In FIGS. 2-9, there is illustrated another presently preferred embodiment of the invention. The fixed storage rack means 2 is the same as in FIG. 1 except for modifications and attachments described below. The flange portion 120 on one of the shelf means 12 extends for a greater distance in a vertical direction than the flange portions 122 on the other shelf means 12. However, the vertical distance between each shelf means 12 and each flange portion 120 or 122 is the same. A female slide guide 124 is secured on the flange portion 120 by headed threaded bolts 126 or other fastening means passing through openings (not shown) in the flange portion 120 and secured in threaded openings 128. The female slide guide 124 extends for substantial the full width of the flange portion 120. The female slide guide 124 has a generally planar base portion 130 that is mounted so that it is centered in a vertical direction on the flange portion 120. An integral stem portion 132 projects outwardly from the base portion 130 and integral C-shaped guide member 132 projects outwardly from the stem portion 132. The female slide guide 124 is an aluminum extrusion.

A male slide guide 140, FIGS. 4 and 5, is mounted on a flange portion 142 which extends downwardly from the back of the shelf means 40 and is located opposite to the flange portion 120. The male slide guide 140 has a metallic support member 144, formed from a material such as steel and having spaced apart base portions 146 and 148 having generally planar surfaces facing the flange portion 142. The support base portions 146 and 148 are secured to the flange portion 142 by suitable means, such as by welding. A raised central body portion 150 is integral with the base portions 146 and 148. The raised central body portion 150 has a longitudinal slot 152 formed therein and the slot has a closed end 154 and an open end 156. A male guide member 158, formed from a suitable plastic material, such as crystalline thermoplastic homopolymers made by the polymerization of formaldehyde marketed by DuPont under the trade designation Delrin, is mounted in the support member 144 and comprises a base portion 160, an integral stem portion 162 and a C-shaped guide member 164. The C-shaped guide member 164 is dimensioned so that it can be positioned in the C-shaped guide member 134 for sliding movement relative thereto. The male slide guide 140 is assembled by securing the support member on the flange portion 142 to form a space 166 between the raised central body portion 150 and opposite portions of the flange portion 142. The male guide member 158 is mounted in the support member 144 by inserting the base portion 160 into the space 166 and the stem portion 162 into the open end 156 of the slot 152 and sliding the male guide member 158 toward the closed end 154 of the slot. A cut-out portion 168 is formed in the base portion 160 and a bendable tab 170 is formed in the central body portion 150. When the cut-out portion 168 is opposite to the bendable tab 170, the bendable tab 170 is bent inwardly so that a portion thereof is located in the cut-out portion 168 so as to limit movement of the male guide member 158 in longitudinal directions. The cut-out portion 168 has a longitudinal extent that is greater than the longitudinal extent of the bendable tab 170 to provide for limited longitudinal movement of the male guide member 158. As illustrated in FIG. 5, the transverse cross-sectional configuration of the base portion 160 is smaller than the transverse cross-sectional configuration of the space 166 and the transverse extent of the stem portion 162 is less than the transverse extent of the slot 152 so that the base member 160 with the limited movement provided by the cut out portion 168 and the tab 170 has limited movement in all directions so as to be readily accommodated in the female slide guide 124. A handle 172 is secured to the flange portion 174 of the shelf means 40 to aid in the movement of the movable storage rack 30.

Figure 6:
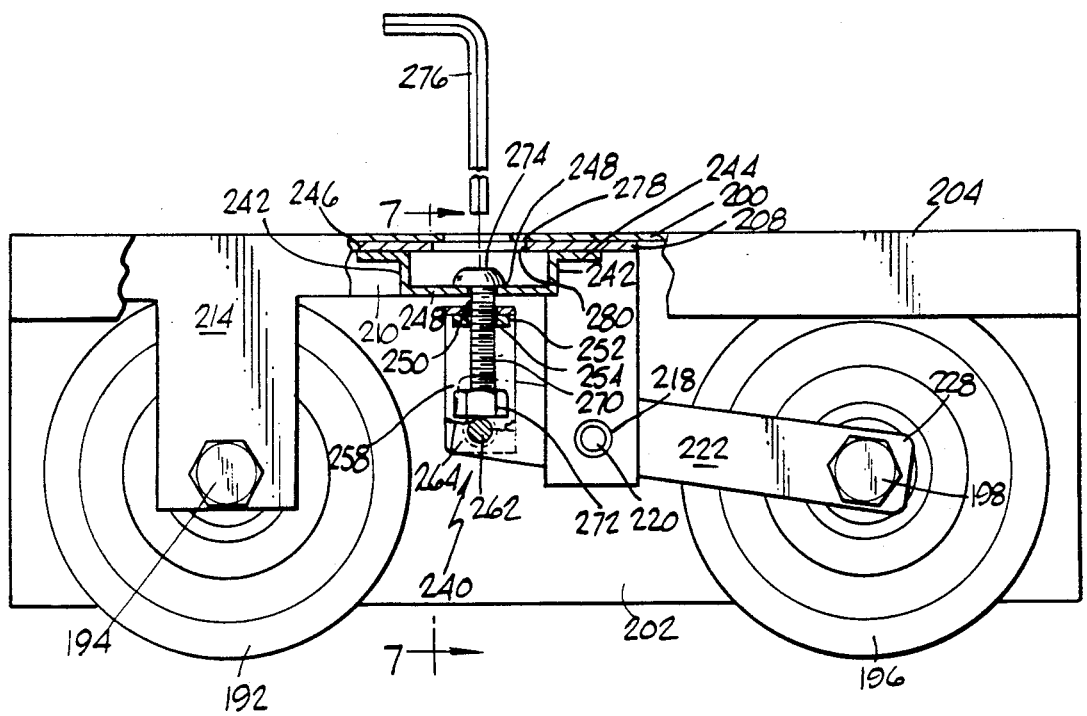
FIG. 6 is a rear elevational view with parts in section of a roller assembly for the movable storage rack means.
Figure 7:
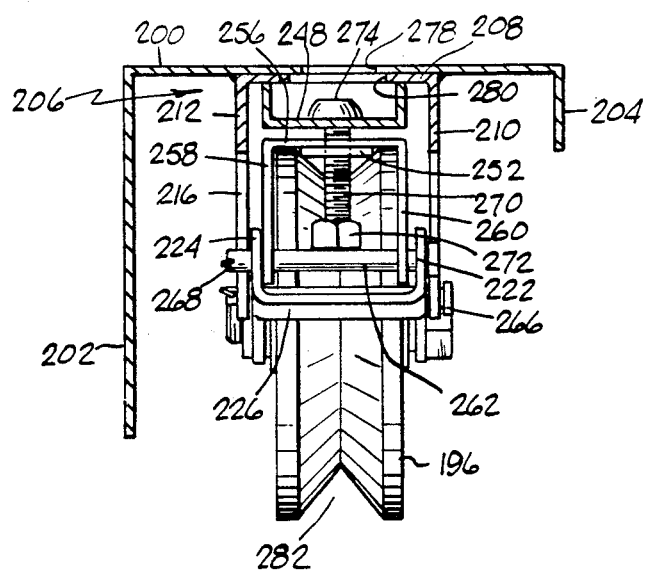
FIG. 7 is a cross-sectional view taken on the line 8—8 of FIG. 6.

In FIGS. 6 and 7, there is illustrated a roller assembly 190 which has one wheel 192 mounted for rotation around a fixed axle 194 and an adjustable wheel 196 which is mounted for rotation around an adjustable axle 198. The roller assembly 190 has a base 200 and integral depending sides 202 and 204. Support means 206 are secured to the underside of the base 202 by suitable means such as by welding and comprise a base portion 208 and integral depending spaced-apart side portions 210 and 212. A first pair of integral support members 214 depend from the side portions 210 and 212 and cooperate to provide the mounting for the fixed axle 194. A second pair of integral support member 216 depend from the side portions 210 and 212 and have openings 218 in which a fixed pivot rod 220 is mounted. A pair of spaced-apart lever arms 222 and 224 are pivotally mounted on the fixed pivot rod 220 and are held in spaced-apart relationship by an integral beam 226. The adjustable axle 198 is mounted in the end portion 228 of each of the pivot arms 222 and 224. The roller assembly 190 is secured to the movable storage racks 30 by suitable means such as by welding a base 200 to each movable storage rack 30.

Adjusting means 240 are provided for controlling the pivotal movement of the lever arms 222 and 224. A support 242 has spaced-apart portions 244 and 246 which are secured to the underside of the base portion 208 by suitable means, such as by welding, and an integral central body portion 248 located below the spaced-apart portions and having an opening 250 extending therethrough. A block member 252 having a threaded opening 254 is secured to the underside of the base 256 of a U-shaped member having integral depending leg portions 258 and 260. A rod 262 extends through openings in the leg portions 258 and 260 and openings in the other end portion 264 of each of the lever arm 222 and 224 and is retained therein by an enlarged head portion 266 and a cotter pin 268. A threaded bolt 270 passes through the opening 250 and is in threaded engagement with the threaded opening 254 in the block member 252. A nut 272 is secured on the threaded bolt 268 and is located to contact the rod 262 to retain the threaded bolt 270 in operating locations and as a safeguard so that the threaded bolt 270 cannot be removed. The threaded bolt 270 has an enlarged head portion 274 and has an opening (not shown) for receiving a tool, such as an allen wrench 276, for rotating the threaded bolt 270. An opening 278 in the base 206 and an opening 280 in the base portion 208 provide access to the head portion 274 for adjusting purposes. Rotation of the threaded bolt 270 moves the U-shaped member 256 to apply a force on the rod 262 to pivot the lever arms 222 and 224. Each of the wheels 192 and 196 have grooves 282 for guiding the movement of the movable storage racks 30 over the tracks 100 and 102.

A dust cover 284, FIG. 2, is secured to the sidewalls 8 and 10 by suitable means, such as threaded bolts 286 or other fastening means passing through openings 288 in a depending portion 290 and openings 292 in the sidewalls 8 and 10 and secured by threaded nuts or other fastening means (not shown). The depending portion 290 is positioned in the opening 294 between the top 12 and the sidewalls 8 and 10. Stop members 296 are provided to limit the movement of the movable storage rack means 30.

In FIG. 8, there is illustrated a portion of the base portion 302 which comprises a central body portion 304 having an opposite pair of depending support legs 306. Inverted V-shaped tracks 308 and 310 ar integral with the central body portion 304. A support leg 312 has a flange portion 314 which is secured to the underside of the central body portion 304 by suitable means, such as by welding. Leveling means 316 are mounted on the underside of the central body portion and comprise leveling glides 318 having a slot 320 at one end so that they can be adjusted by a screw driver 322.

In FIG. 9, there is illustrated the bottom stop means 330 comprising a body portion 332 and depending leg portion 334. Slots 336 and 338 are formed in the central body portion 304 on each side of the sidewalls 8 and 10 and slots 340 are formed in the flanges 342 of the sidewalls 8 and 10. The bottom stop means 330 are assembled by passing one of the depending leg portions 334 and the body portion 332 through the slots 340 until the depending leg portions 334 are above the slots 336 and 338. The depending leg portions are then moved downwardly until the body portion 332 contacts the central body portion 304. A threaded bolt 344 is then passed through an opening 346 in the body portion 332 and an opening 348 in the sidewalls 8 and 10 and secured by a threaded nut (not shown).

In operation, the fixed storage rack means 2 is placed at a desired location and the corner leveling glides 182 are adjusted to level the fixed storage rack means 2 and then the other leveling guides are moved into contact with surface supporting the fixed storage rack means 2. A movable storage rack means 30 is then moved to a position at one end of the fixed storage rack means 2. One of the wheels 192 or 196 is aligned with one of the tracks 100 or 102 and the male guide member 158 is moved until it is aligned with female guide member 132. The movable storage rack means 30 are then rolled over the track 100 or 102. After the desired number of movable storage rack means 30 have been positioned on the tracks 100 and 102, the dust cover 284 is secured to the sidewalls 8 and 10. There is a clearance between the dust cover 284 and the top of the movable storage rack means 30 to allow for the adjustment thereof. An allen wrench 276 is then used to rotate the threaded bolt 270 to align the movable storage rack means 30 with the fixed storage rack means 2.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for use in the storage and retrieval of tape cartridges comprising:
   a stationary storage rack having a plurality of horizontally-extending shelves which are equally spaced-apart in a vertical direction;
   each of said shelves supporting a plurality of equally-sized tape cartridge storage holder units in a side-by-side relationship with the tape cartridges in said holder units facing outwardly;
   at least two movable storage racks located in front of said stationary storage rack;
   each of said movable storage racks having a plurality of horizontally-extending shelves which are equally spaced-apart in a vertical direction;

each of said shelves being dimensioned to receive and support at least one tape cartridge storage holder unit similar to said plurality of tape cartridge storage holder units with the tape cartridges therein facing outwardly;
mounting means for mounting each of said movable storage racks to permit movement thereof to provide for access to at least some of said tape cartridge storage holder units on said shelves of said stationary storage rack;
alignment adjusting means for adjusting the alignment of each of said movable storage racks relative to said stationary storage rack;
guide means for guiding the movement of said movable storage racks;
wherein said mounting means comprise:
  a base extending outwardly from said bottom portion of said fixed storage rack means and having an upwardly facing surface;
  track means on said base for guiding each of said movable storage rack means for movement over said upwardly facing surface; and
  at least two spaced apart wheels mounted on said bottom portion of each of said movable storage rack means and located to be in contact with said upwardly facing surface to permit rolling movement of each of said movable storage rack means over said upwardly facing surface;
  one of said at least two spaced-apart wheels rotates around a fixed axle;
  the other of said at least two spaced-apart wheels rotates around an axle that is adjustable;
wherein said adjusting means comprises:
  a pivot rod mounted at a fixed location;
  a pair of spaced-apart lever arms mounted for pivotal movement on said pivot rod;
  said adjustable axle mounted on opposite end portions of said lever arms on one side of said pivot rod;
  force applying means for applying a force to opposite end portions of said lever arms on the other side of said pivot rod to pivot said adjustable axle;
wherein said force applying means comprise:
  a rod extending between and mounted on said opposite end portions of said lever arms on said other side of said pivot rod;
  a support mounted at a fixed location and having an opening extending therethrough;
  a movable member mounted for movement toward or away form said support and having a threaded opening extending through a portion thereof;
  said rod mounted on said movable member for movement therewith and located at a location spaced from said threaded opening;
  a threaded bolt having an enlarged head portion passing through said opening and in threaded engagement with said threaded opening;
  said other wheel applying a force on said lever arms to urge said enlarged head portion into contact with the portions of said support surrounding said opening;
  said enlarged head portion having a configuration to receive a tool for rotating said threaded bolt to move said movable member relative to said support to move said rod to move said lever arms around said pivot to adjust said adjustable axle; and wherein said movable member comprises:
  an inverted U-shaped member having a base and two spaced-apart legs;
  a block secured to said base and located between said spaced apart legs;
  said threaded opening extending through said block;
  each of said spaced-apart legs having an opening formed therein; and
  said rod passing through said openings in said legs.

2. Apparatus for use in the storage and retrieval of tape cartridges comprising:
  a stationary storage rack having a plurality of horizontally-extending shelves which are equally spaced-apart in a vertical direction;
  each of said shelves supporting a plurality of equally-sized tape cartridge storage holder units in a side-by-side relationship with the tape cartridges in said holder units facing outwardly;
  at least two movable storage racks located in front of said stationary storage rack;
  each of said movable storage racks having a plurality of horizontally-extending shelves which are equally-spaced-apart in a vertical direction;
  each of said shelves being dimensioned to receive and support at least one tape cartridge storage holder unit similar to said plurality of tape cartridge storage holder units with the tape cartridges therein facing outwardly;
  mounting means for mounting each of said movable storage racks to permit movement thereof to provide for access to at least some of said tape cartridge storage holder units on said shelves of said stationary storage rack;
  alignment adjusting means for adjusting the alignment of each of said movable storage racks relative to said stationary storage rack;
  guide means for guiding the movement of said movable storage racks;
  wherein each of said guide means comprise:
    each of said shelves of said stationary storage rack having a front surface facing said at least two movable storage racks;
    a first portion of said guide means secured to said front surface of at least one of said shelves;
    said first portion having a length corresponding to the length of said surface;
    each of said shelves of said at least two movable storage rack means having a rear surface facing said stationary storage rack;
    a second portion of said guide means secured to said rear surface of at last one of said shelves on each of said at least two movable storage racks and located to be engaged with said first portion to guide the movement of said at least two movable storage rack means; and
    guide mounting means for mounting each of said second portions on said rear surface so that each of said second portions is capable of limited movement relative to said rear surface in at least vertical and horizontal directions.

3. The invention as in claim 2 and further comprising:
  said first portion comprising a base portion, an integral stem portion projecting outwardly from said base portion and an integral female guide member projecting outwardly from said stem portion; and
  said second portion comprising a base portion, an integral stem portion projecting outwardly from said base portion and an integral male portion projecting outwardly from said stem portion and located in said female portion for sliding movement relative thereto.

4. The invention as in claim 3 wherein said mounting means for mounting said second portion comprise:
a support member having a base portion having a generally planar surface facing and secured to said rear surface and an integral central body portion spaced from said rear surface to form a space for said base portion of said second portion;
said central body portion having a longitudinally extending slot formed therein and having a closed end and an open end for receiving said stem portion of said second portion;
retaining means for retaining said stem portion in said slot while permitting limited longitudinal movement of said second portion; and
said space and said slot having a cross-sectional configuration in a vertical direction greater than the cross-sectional configuration of said base portion and said stem portion in the vertical direction to allow for said limited vertical movement.

5. The invention as in claim 4 wherein:
said retaining means, said space and said slot being dimensioned to permit limited movement of said second portion in all directions.

6. The invention as in claim 2 wherein said mounting means for said at least two movable storage racks comprise:
a base extending outwardly from said bottom portion of said fixed storage rack means and having an upwardly facing surface;
track means integral with said base guiding each of said movable storage rack means for movement over said upwardly facing surface; and
at least two spaced-apart wheels mounted on said bottom portion of each of said movable storage rack means and located to be in contact with said upwardly facing surface to permit rolling movement of each of said movable storage rack means over said upwardly facing surface.

7. The invention as in claim 6 wherein:
one of said at least two spaced-apart wheels rotates around a fixed axle; and
the other of said at least two spaced-apart wheels rotates around an axle that is adjustable.

8. The invention as in claim 7 wherein said alignment adjusting means comprises:
adjusting means for adjusting said adjustable axle.

9. The invention as in claim 8 wherein said adjusting means comprise:
a pivot rod mounted at a fixed location;
a pair of spaced-apart lever arms mounted for pivotal movement on said pivot rod;
said adjustable axle mounted on opposite end portions of said lever arms on one side of said pivot rod; and
force applying means for applying a force to opposite end portions of said lever arms on the other side of said pivot rod to pivot said adjustable axle.

10. The invention as in claim 9 wherein said force applying means comprise:
a rod extending between and mounted on said opposite end portions of said lever arms on said other side of said pivot rod;
a support mounted at a fixed location and having an opening extending therethrough;
a movable member mounted for movement toward or away from said support and having a threaded opening extended through a portion thereof;
said rod mounted on aid movable member for movement therewith and located at a location spaced from said threaded opening;
a threaded bolt having an enlarged head portion passing through said opening and in threaded engagement with said threaded opening;
said other wheel applying a force on said lever arms to urge said enlarged head portion into contact with the portions of said support surrounding said opening; and
said enlarged head portion having a configuration to receive a tool for rotating said threaded bolt to move said movable member to move said rod to move said lever arms around said pivot to adjust said adjustable axle.

11. Apparatus for use in the storage and retrieval of tape cartridges comprising:
a stationary storage rack having a plurality of horizontally-extending shelves which are equally spaced-apart in a vertical direction;
each of said shelves supporting a plurality of equally-sized tape cartridge storage holder units in a side-by-side relationship with the tape cartridges in said holder units facing outwardly;
at least two movable storage racks located in front of said stationary storage rack;
each of said movable storage racks having a plurality of horizontally-extending shelves which are equally spaced-apart in a vertical direction;
mounting means for mounting each of said movable storage racks to permit movement thereof to provide for access to at least some of said tape cartridge storage holder units on said shelves of said stationary storage rack;
adjusting means for adjusting the alignment of each of said movable storage racks relative to said stationary storage rack;
guide means for guiding the movement of said movable storage racks; and
each of said shelves on said movable storage rack means being dimensioned to accommodate only one tape cartridge storage holder unit.

12. The invention as in claim 11 wherein:
each of said shelves of said stationary storage rack having a width that is slightly more than twice the width of each of said tape cartridge storage holder units so that said tape cartridge storage holder units can be placed on each of said shelves in a back to back relationship so that said stationary storage rack has a first open wall portion and a second open wall portion.

13. The invention as in claim 12 wherein:
said plurality of movable racks comprises a first plurality of movable storage racks and a second plurality of movable storage racks;
mounting means for mounting each of said first plurality of movable storage racks for movement in linear directions parallel to said first open wall portion and for mounting each of said second plurality of movable storage racks for movement in linear directions parallel to said second open wall portion;
said first plurality of movable storage racks being in a number less than the number of said tape cartridge storage holder units that can be placed on one of said shelves of said stationary storage rack in a side-by-side relationship to provide access to said tape cartridge storage holder units on said shelves facing outwardly from said first open wall portion of said stationary storage rack; and said second plurality of movable storage racks being in a number less than the number of said tape cartridge storage holder units that can be placed on one of said shelves of said stationary storage rack in said side-by-side relationship to provide access to said tape cartridge storage holder units on said shelves facing outwardly from said second open wall portion of said stationary storage rack.

14. Apparatus for use in the storage and retrieval of tape cartridges comprising:

a stationary storage rack having a plurality of horizontally-extending shelves which are equally spaced-apart in a vertical direction;

each of said shelves supporting a plurality of equally-sized tape cartridge storage holder units in a side-by-side relationship with the tape cartridges in said holder units facing outwardly;

at least two movable storage racks located in front of said stationary storage rack;

each of said movable storage racks having a plurality of horizontally-extending shelves which are equally spaced-apart in a vertical direction;

each of said shelves being dimensioned to receive and support at least one tape cartridge storage holder unit similar to said plurality of tape cartridge storage holder units with the tape cartridges therein facing outwardly;

mounting means for mounting each of said movable storage racks to permit movement thereof to provide for access to at least some of said tape cartridge storage holder units on aid shelves of said stationary storage rack;

adjusting means for adjusting the alignment of each of said movable storage racks relative to said stationary storage rack;

guide means for guiding the movement of said movable storage racks;

upper and lower stop means for preventing movement of said movable storage racks off of said base;

wherein said lower stop means comprises:

a pair of stop members, each having a body portion and at least one integral depending leg portion;

said stationary storage rack having a pair of opposite sidewalls;

a base extending between and projecting outwardly in at least one direction from said sidewalls;

each of said sidewalls having at least one slot formed therein;

said base having spaced-apart slots formed therein;

each body portion extending through one of said slots in said sidewalls and each depending leg portion extending through one of said slots in said base so that a portion of said body portion extends outwardly from each of said sidewalls and upwardly from said base to be contacted by one of said movable storage racks to prevent further movement thereof; and securing means for securing each of said stop members to one of said sidewalls.

* * * * *